March 10, 1936.  B. C. GRUENBERG  2,033,468
ELECTRICAL COOKING APPARATUS
Filed Jan. 13, 1934  2 Sheets-Sheet 2
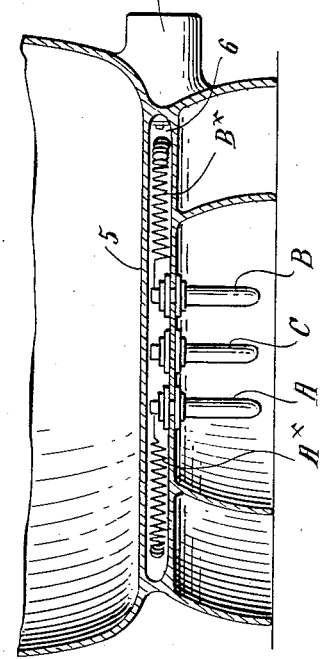
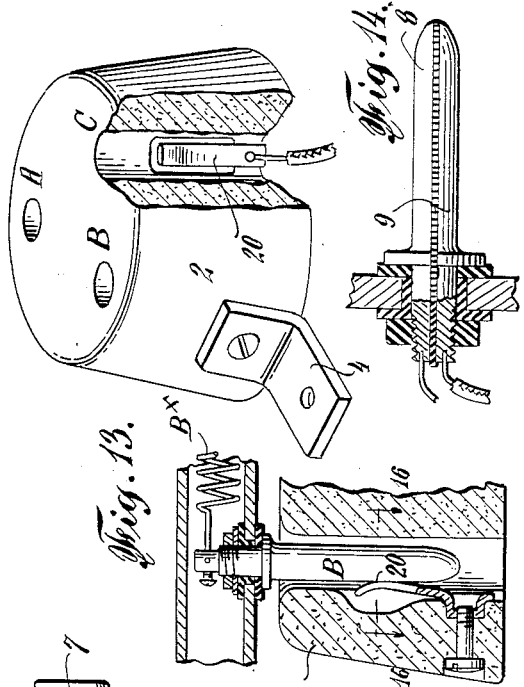
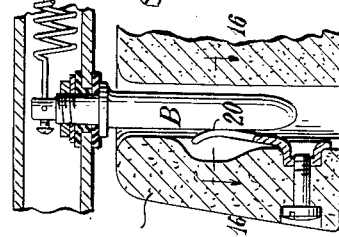
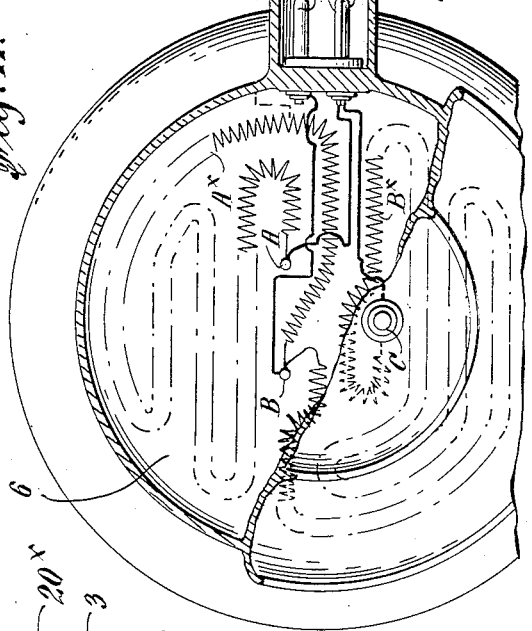
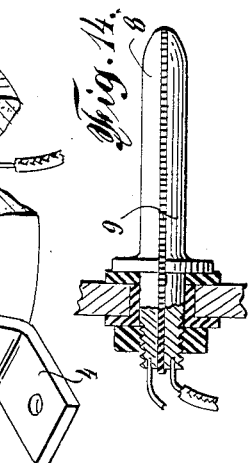
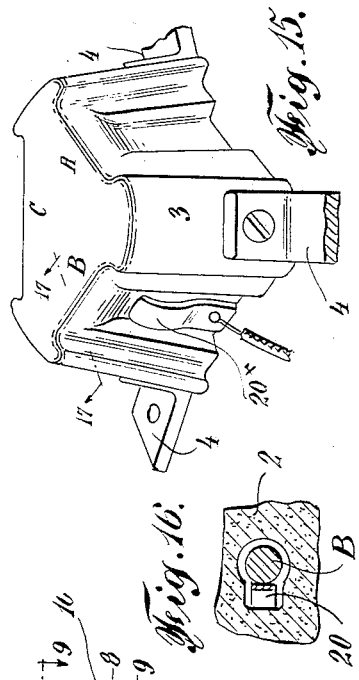
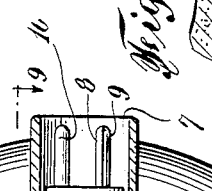
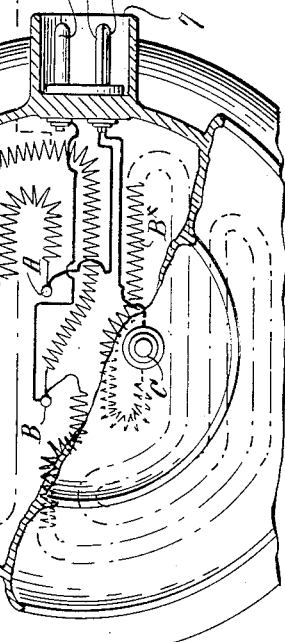
INVENTOR
Benjamin C. Gruenberg
BY
ATTORNEY Patented Mar. 10, 1936

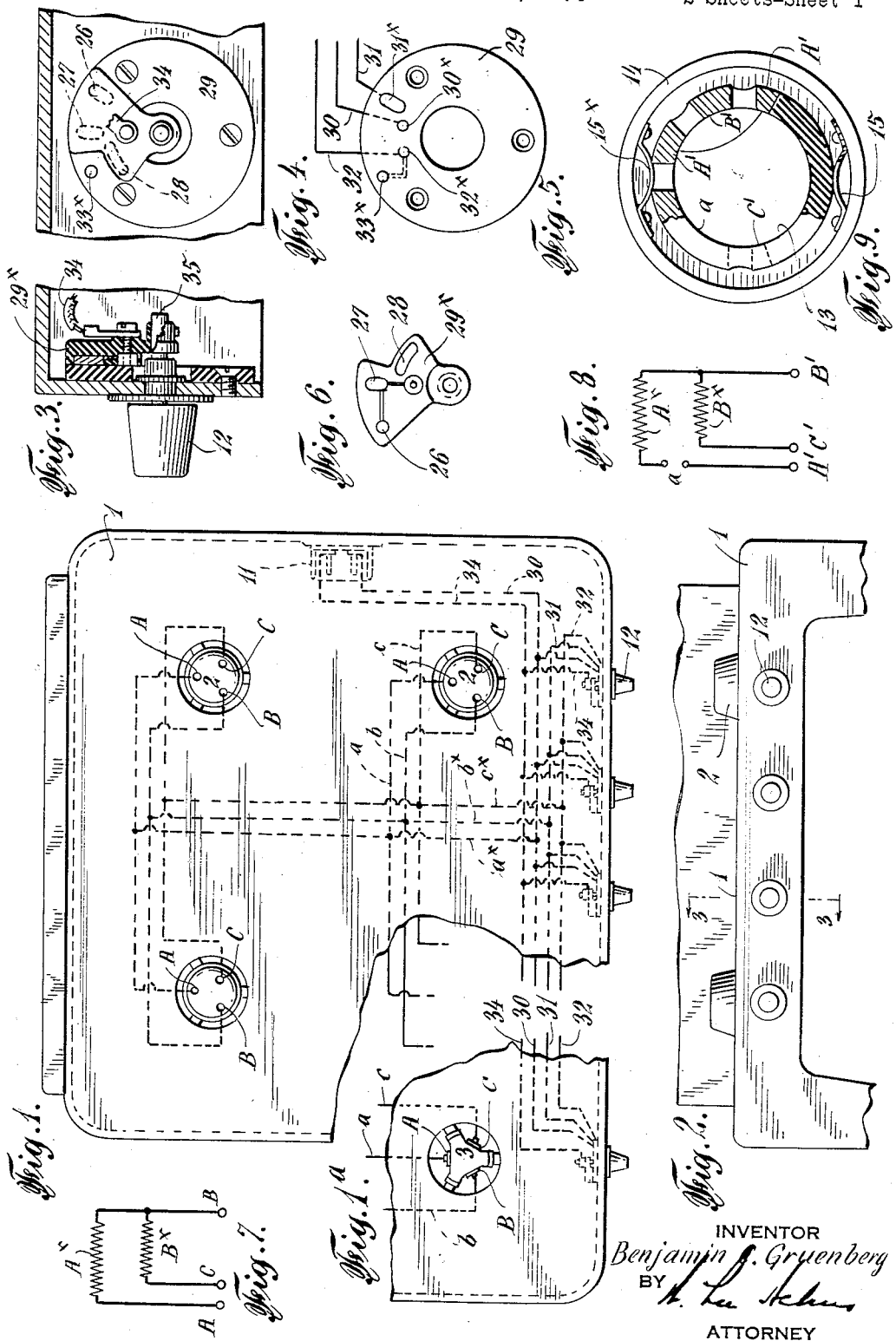

2,033,468

UNITED STATES PATENT OFFICE 2,033,468

ELECTRICAL COOKING APPARATUS

Benjamin C. Gruenberg, New York, N. Y.

Application January 13, 1934, Serial No. 706,508

2 Claims. (Cl. 219—43)

The object of the present invention is to provide an electrical cooking apparatus in which the heating elements are contained within the cooking vessels, and in which the vessels are supplied with electrical current by the operation of the apparatus, and not exposed to a hot surface or a flame, as in the familiar type of stove or cooking range, including electrical stoves.

It is contemplated that the cooking vessels in use with this apparatus shall be so constructed as to permit their use independently of the special range or tray, if desired, the electrical current being in that case supplied through the familiar flexible cord.

A further object is to provide a vessel with means for controlling the degree of heat, when the vessel is used independently of the special range or tray herein specified.

In other words, this invention provides: (a) cooking vessels operable as complete units; (b) vessels operable in connection with the special range or tray; (c) vessels and a special range or tray so co-acting that when in proper juxtaposition the degree of heat generated within the vessel may be controlled by positive means carried by the tray; (d) cooking vessels in which the heat may be controlled by positive means carried by the vessel.

The invention will be described with reference to the accompanying drawings in which:

Fig. 1 is a fragmentary plan view of a tray (the term "tray" covering any suitable supporting member for heat-generating utensils) embodying a circuit, socket members and controls, in accordance with the invention.

Fig. 1a is a modification of the preceding figure as to the socket members.

Fig. 2 is a fragmentary elevation of the device shown in Fig. 1.

Fig. 3 is a vertical fragmentary section on the line 3—3, Fig. 2.

Fig. 4 is a rear elevation of the structure shown in Fig. 3.

Fig. 5 is a plan view of the contact plate shown in the preceding figure.

Fig. 6 is a plan view of the movable switch arm employed in conjunction with the plate of Figure 5.

Fig. 7 is a diagrammatic view of heater element wiring for use with a two-plug connection for the house current socket, one plug being dual, as shown in Figures 10 and 14.

Fig. 8 is a view similar to Figure 7 showing the circuit of the preceding figure broken by spaced contacts adapted to receive a switch member whereby one or both of two heating elements may be employed, particularly for use with the structures of Fig. 9.

Fig. 9 is a plan view, partly in section, and somewhat schematic, showing a rotatable switch for controlling the flow of electric current through two coils in the utensil and the control enabling the flow in series, through one coil, or through both coils in parallel.

Fig. 10 is a vertical section through the base area of a cooking utensil showing the formation thereof.

Fig. 11 is a fragmentary horizontal section through the utensil of the preceding figure.

Fig. 12 is a perspective view, partly broken away, of a socket device for receiving the plugs of the cooking utensil.

Fig. 13 is a fragmentary sectional elevation of the socket member shown in Fig. 12 and immediately connected members of the cooking utensil.

Fig. 14 is an enlarged detail view of the multiplug.

Fig. 15 is a perspective view of a modified form of socket member.

Fig. 16 is a horizontal section on the line 16—16, Fig. 13.

Fig. 17 is a fragmentary section on the line 17—17, Fig. 15.

In the drawings, 1 indicates a horizontal support which will generally be transportable and which may be in form of a tray, or a member provided with legs and having the characteristics of a range. In spaced relationship and carried by member 1, as, for example, by forming receiving apertures at spaced points, are a plurality of socket members which project upwardly above the supporting surface of member 1. In the present embodiment, the socket members 2 or 3, as the case may be, carry angularly bent bracket arms 4 which will be secured to the undersurface of member 1 by bolts or by welding, as desired.

Each socket member is provided with three sockets to receive three plugs carried by the heating utensil. The general form of the base of the heating utensil is indicated in Fig. 10. Below the bottom wall 5 is a chamber 6 which receives a plurality of heating elements, as, for example, coils of resistance wire, the heating elements being alike or relatively different and so connected to the plugs, and the latter so related to the socket member and to a switch control that current may flow through a single heating coil, two coils in series, or two coils in parallel, furnishing different amounts of heat.

It will be noted by reference to Fig. 10, that the plugs are within the heating utensil, that is to say, the walls of the base of the utensil extend downwardly below the plugs and surround the same. By this means danger of short-circuiting or fouling of the contact elements through the spilling of material from the heating utensil or from some other source while the utensil is in place, is entirely avoided, and furthermore, the utensil may be removed from member 1 and used in the usual manner by plug connections with the heating coils, located at the side of the utensil, within the sleeve 7 of Fig. 10.

In the present embodiment of heating utensil, the heating coils are two in number a coil $Ax$ and a coil $Bx$. One end of the coil $Ax$ is connected to plug A and the opposite end is connected to plug B. One end of coil $Bx$ is connected to plug C and the opposite end to plug B.

The utensil is provided with lateral plugs within a surrounding sleeve 7. When the vessel is not provided with a control device one plug is multiple having a section 8 insulated from its companion section 9, the sections being connected as illustrated in Fig. 11. In such case, the utensil receives maximum heat, both coils being operated in parallel.

A diagram of the coils and plugs A, B, C of Fig. 11, is shown in Fig. 7. It will be noted that by flowing current from plug A to plug C, the coils will be in series for relatively low heat. Flowing current from plug A to plug B, thus through one coil, will result in medium heat, and flowing current through plugs A and C simultaneously to plug B as an outlet, the coils will be heated in parallel for high heat.

Means are provided for controlling the heat range according to the above paragraph and individually for the socket members 2. Connected to member 1 at 11, Fig. 1, is a plug or socket connection for the house current and from said connection pass feed wires 30, 34. Mounted on a suitable supporting area of member 1 are rotatable switch controls, one for each socket member 2. In Fig. 1, the sockets of each socket member 2 have been lettered, each socket in accordance with the plug which it receives, thus A, B, or C. Taking the right-hand lower socket member of Fig. 1, as an example, the contact prong of socket A is connected by a wire $a$ to a branch wire $a^\times$ connected directly with feed wire 30. The socket B is connected by wire $b$ with a connecting wire $b^\times$, in turn connected to a wire 31, leading to a rotary switch control member 12. The prong of socket C is connected by a wire $c$ to a connecting wire $c^\times$ leading to a wire 32 connected to the control 12.

The control 12 comprises a fixed contact plate 29 having a plurality of contacts as follows: $30x$ connected with feed wire 30 and through wires $a$, $a^\times$ with socket member A; $31x$ connected to wire 31 and thence through wires $b$, $b^\times$ to socket member B; contact $32x$ connected by wire 32 with wires $c$, $c^\times$ to socket member C.

Fixed contact plate 29 (Fig. 5) has in operative register therewith a switch arm $29x$ having thereon contacts 26, 27, and 28. The switch arm is electrically connected to feed wire 34 and the arm is mounted on a shaft 35 provided with a finger grip by means of which the shaft may be rotated. Feed wire 34 is in electrical connection with contacts 26 and 27. When shaft 35 is turned to bring contact 27 into operative register with contact $30x$ of plate 29, current will flow from wire 34 through contact 27, thence to wire 32, thence through connecting wires $c$, $c^\times$ to socket member C, and thence through coil $Bx$ (Figs. 7 and 11), thence through coil $Ax$ thence through socket connection A connecting wires $a$, $a^\times$ to return wire 30, and low heat of the cooking utensil will be produced because the coils $Bx$, $Ax$ will be heated in series.

To produce an intermediate heating temperature in the cooking utensil, contact arm $29x$ is moved to bring contact 26 into register with contact $31x$. Current will then flow from wire 34 to contact 26, thence to contact $31x$ through wire 31 and connecting wires $b$, $b^\times$ to socket member B thence through the resistance coil $Ax$ through socket member A to connecting wires $a$, $a^\times$, to the return wire 30. In such case, the coil $Ax$ only will be heated.

To produce high heat, the contact arm is turned until contact 27 is in register with contact $31x$ and contact 28 bridges contacts $30x$ and $32x$. In such case, the current will flow from wire 34 through contacts 27 and $31x$ through connecting wires $b$, $b^\times$ to socket member B, thence through coils $Ax$, $Bx$ in parallel, the return being through plug and socket members A, connecting wires $a$, $a^\times$ to return wire 30, through plug and socket members C to connecting wires $c$, $c^\times$, thence to wire 32 to contact member $32x$, thence to the bridge contact 28 carrying the current to contact $30x$ and return wire 30.

The above description with regard to the lower right-hand socket device and plugged-in cooking utensil will suffice for the remaining similarly constructed controls and socket members, each two being co-related for individual control of a specific socket member.

In the form of socket type structure shown in Fig. 15, full clearance is given for the upper moving portion of the contact prong $20x$ and three similar prongs $20xx$ will be carried by the cooking utensil in substitution of the plugs A, B, and C of Fig. 10.

In use of the range above illustrated and described, the current is automatically established by placing the cooking utensil in proper position relative to any of the socket members and the current is automatically discontinued on the removal of the utensil so that there is no waste of electricity through neglect to shut off the current after using.

When the low heat is desired, it may conveniently be secured by turning the control unit, whether it be mounted directly upon the vessel or upon the tray, or range-like support carrying the socket members. Thus, when cooking has been completed, the control makes it possible to leave the utensil upon the tray or range to keep the contents warm by turning the control to low heat.

The device is, of course, adapted to receive accessory apparatus such as motor-driven devices for mixing, grinding, etc.

If desired, the heating control may be carried by the vessel itself. In Fig. 9 I have shown diagrammatically such a control. The ring-like member 13, Fig. 9 will be a part of the vessel, as, for example, a ring carried by sleeve 7 which would be circular instead of oval, the ring being of insulation material. The ring may be carried at any suitable point of the vessel.

The plug contacts of the vessel for connection with the usual flexible cord connection with the house current would be the usual positive and negative plugs, and dual plug shown in Fig. 14 would not be employed.

Carried by the ring are contact segments A',

B', C', the segments A' being two in number, and spaced. C' will be connected to one plug for the house current, which may be conveniently termed the outlet plug. A' is connected to the second plug for the house current conveniently termed the inlet plug. In addition, there would be provided a supplementary contact $a$. Each contact of the ring-like carrier 13 would be connected to its corresponding points A', B', or C' as in Fig. 8, and the contacts would be in turn connected to their respective coils at the corresponding points A, B, C, indicated in Fig. 11. The lead between contact member A' and its coil A$x$ would be broken, however, as indicated diagrammatically in Fig. 8, the connection to be established by bridging contacts A' and supplementary contact $a$ of the ring-like carrier 13. Surrounding contact carrier 13 is a bridging ring 14 of insulation material carrying two spring bridge-switches 15, 15$x$.

When ring 14 is turned to bridge contacts A' $a$, current will flow through the area between the corresponding points of the arrangement shown in Fig. 8, heating the wire or coil between those points and producing low heat. When control member 14 is turned to bridge contacts A' and B', coil B$x$ will be energized, producing medium heat. When a further rotational movement is given to member 14 and contacts $a$ and C' are bridged by means of 15 and A' and B' by means of bridge 15$x$, current will flow through A$x$ and B$x$ in parallel for the producing of high heat.

Various changes may be made in the form and arrangement of the elements comprising the embodiments illustrated in the drawings without departing from the spirit of the invention. In the use of the socket members 2, the wall of each socket may be indented at the line of reception of the prong 20 so that the prong may freely move inwardly without contact of its moving portion with the socket, and thus may be more effectively shaped than in the usual practice.

Having described my invention, what I claim and desire to secure by Letters Patent, is as follows:—

1. In electric cooking apparatus, and in combination with a horizontal supporting member carrying a plurality of spaced service outlets, each outlet having three contact members, of a cooking utensil provided with two heating resistance units and with three contact members connected to said resistance units at the base of the utensil and adapted to be plugged into one of said service outlets, and also provided laterally with two plugs connected with said resistance units and adapted for electrical connection with a house current, one of said plugs being dual and comprising two mutually insulated contacts having leads to both of said resistance units.

2. Electric cooking apparatus comprising a cooking utensil provided with a plurality of resistance units adapted to be plugged into a house service outlet, and controlling means carried by the vessel for energizing said resistance units in series, singly, and in parallel, whereby the utensil may be given relatively low heat, and also selectively intermediate heat or high heat through energizing the same resistance units in both cases, the said controlling means comprising a plurality of relatively spaced contact members carried by the vessel, two contacts being inlets for house current, the third contact member being an outlet for house current, a fourth contact connected to said resistance units and a fifth being a bridging contact intermediate one of said resistance units and one of the first named contacts, and a rotary bridging member carried by the vessel having two bridge-switches adapted to engage said contacts.

BENJAMIN C. GRUENBERG.